(12) United States Patent
Spickelmire

(10) Patent No.: US 6,375,030 B1
(45) Date of Patent: Apr. 23, 2002

(54) LIQUID STABILIZING BAFFLE

(75) Inventor: James Spickelmire, Grangeville, ID (US)

(73) Assignee: W. James Spickelmire, Grangeville, ID (US)

( * ) Notice: Subject to any disclaimer, the term of this patent is extended or adjusted under 35 U.S.C. 154(b) by 0 days.

(21) Appl. No.: 09/533,065

(22) Filed: Mar. 22, 2000

Related U.S. Application Data

(63) Continuation of application No. 09/224,170, filed on Dec. 31, 1998, now Pat. No. 6,308,856, which is a continuation of application No. 09/073,891, filed on May 6, 1998, now Pat. No. 5,890,618.

(51) Int. Cl.⁷ ............................................... B65D 25/00
(52) U.S. Cl. ................................................... 220/563
(58) Field of Search ............................. 220/563, 4.14, 220/4.15, 734

(56) References Cited

U.S. PATENT DOCUMENTS

| | | |
|---|---|---|
| 2,379,126 A | 6/1945 | Welden |
| 2,860,809 A | 11/1958 | Perry |
| 3,288,186 A | 11/1966 | Headrick |
| 3,349,953 A | 10/1967 | Conaway et al. |
| 3,804,292 A | 4/1974 | Chiti |
| 3,979,005 A | 9/1976 | Robinson et al. |
| 4,013,190 A | 3/1977 | Wiggins et al. |
| 4,550,848 A | 11/1985 | Sucato |
| 4,796,773 A | 1/1989 | Gerhard |
| 4,858,778 A | 8/1989 | Patrick |
| 4,927,045 A | 5/1990 | Lichka |
| 5,890,618 A | 4/1999 | Spickelmire |
| 6,062,417 A * | 5/2000 | Evans ......................... 220/563 |
| 6,308,856 B1 * | 10/2001 | Spickelmire ................ 220/563 |

* cited by examiner

*Primary Examiner*—Steven Pollard
(74) *Attorney, Agent, or Firm*—Wells St. John P.S.

(57) ABSTRACT

A liquid stabilizing baffle is described in which first and second loops are formed by strips of flexible spring material. The first and second loops intersect one another at two intersection points along an axis. A third loop, formed of a flexible spring material strip is joined with the first and second loops at points between the intersection points of the first and second loops.

20 Claims, 8 Drawing Sheets

LIQUID STABILIZING BAFFLE

RELATED APPLICATIONS

This application is a continuing application based on parent application Ser. No. 09/224,170 filed on Dec. 31, 1998, now issued as U.S. Pat. No. 6,308,856 and which is a continuing application based on parent application Ser. No. 09/073,891 filed on May 6, 1998, now issued as U.S. Pat. No. 5,890,618.

TECHNICAL FIELD

The present invention relates to stabilization of fluids using baffles.

BACKGROUND OF THE INVENTION

It has long been recognized that free flowing fluids can be dangerous to balance and control of vehicles. Tankers carrying less than full tanks of any fluid risk turnover when cornering, due to the centrifugal movement of the fluid to the outside dimension of the tank during the turn. The fluid weight will shift quickly and dramatically to the outside of the turn, upsetting the balance of the supporting vehicle. At best, this hinders proper vehicle control; at worst, the shifting weight will cause the vehicle to roll over.

Free fluid in smaller tanks also represents a problem even where weight shifting is not a serious problem. Shifting chemicals in a agricultural chemical tank, for example, can affect the application rate of the chemical. The chemical may shift away from the intake of the application pump, disrupting fluid flow to the pump even though sufficient fluid is available in the tank. Still further, sloshing fluids in tanks causes repeated stressing of the tank walls. Such repeated uneven stressing causes the material of the tank walls to gradually work-harden and fail.

Free fluid in nature in the form of waves and current may also be a great cause of erosion. Even structural seawalls and breakwaters may be broken and eroded by exceptional wave action that may occur during storms or flooding.

Clearly there has been a long felt need for an apparatus by which wave or fluid current forces may be dampened. The present apparatus is provided to fulfill this need as will be understood from the following description.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
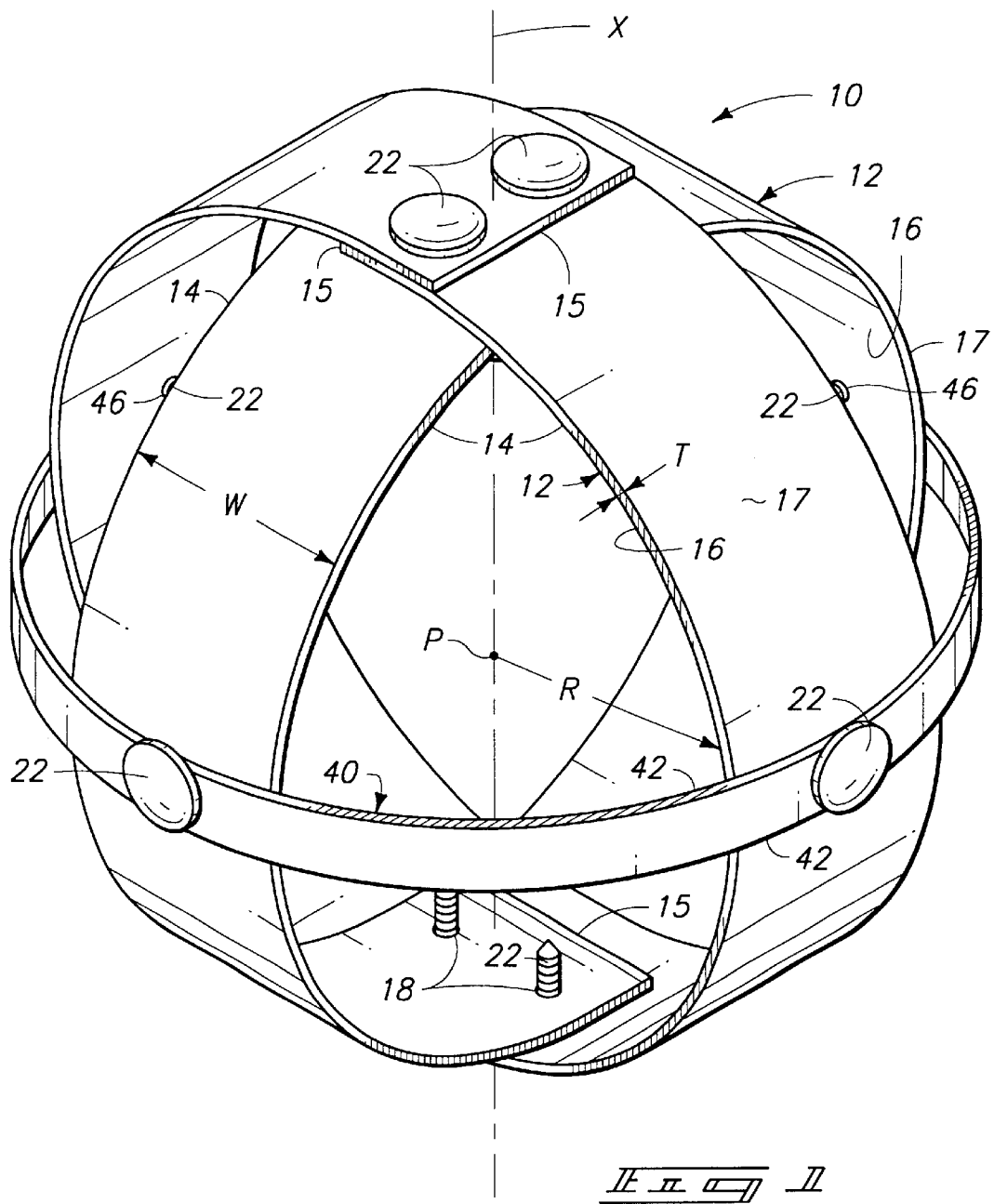
FIG. 1 is a perspective view showing a preferred baffle configuration.

This disclosure of the invention is submitted in furtherance of the constitutional purposes of the U.S. Patent Laws "to promote the progress of science and useful arts" (Article 1, Section 8).

A liquid stabilizing baffle embodying preferred features of the present invention is generally designated in the accompanying drawings by the reference numeral 10. A complete system in which a plurality of individual baffles 10 may be provided is partially shown in FIGS. 2 and 3.

Figure 6:
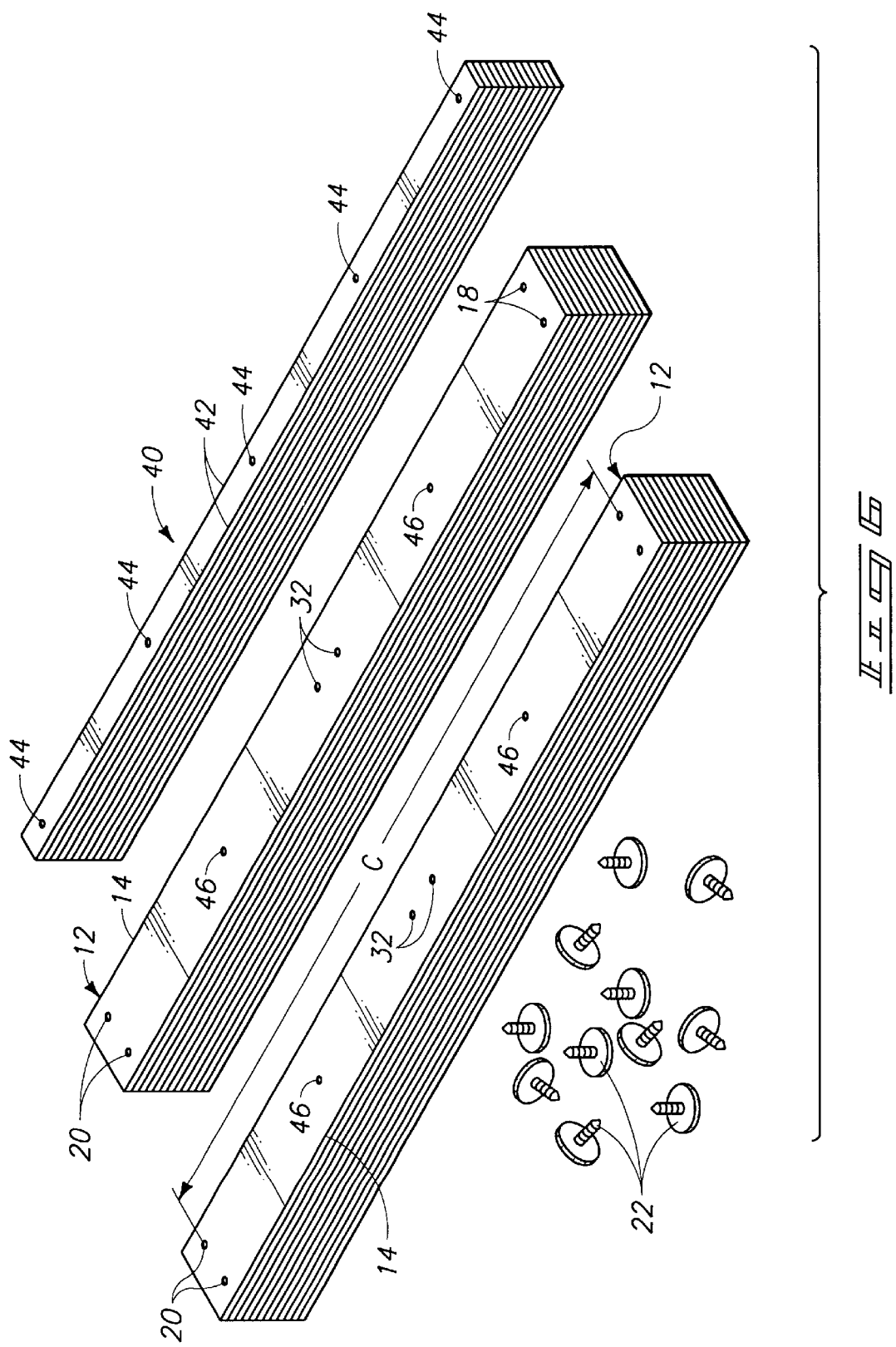
FIG. 6 is a perspective diagrammatic view illustrating components of the preferred baffles in kit form.
Figure 7:
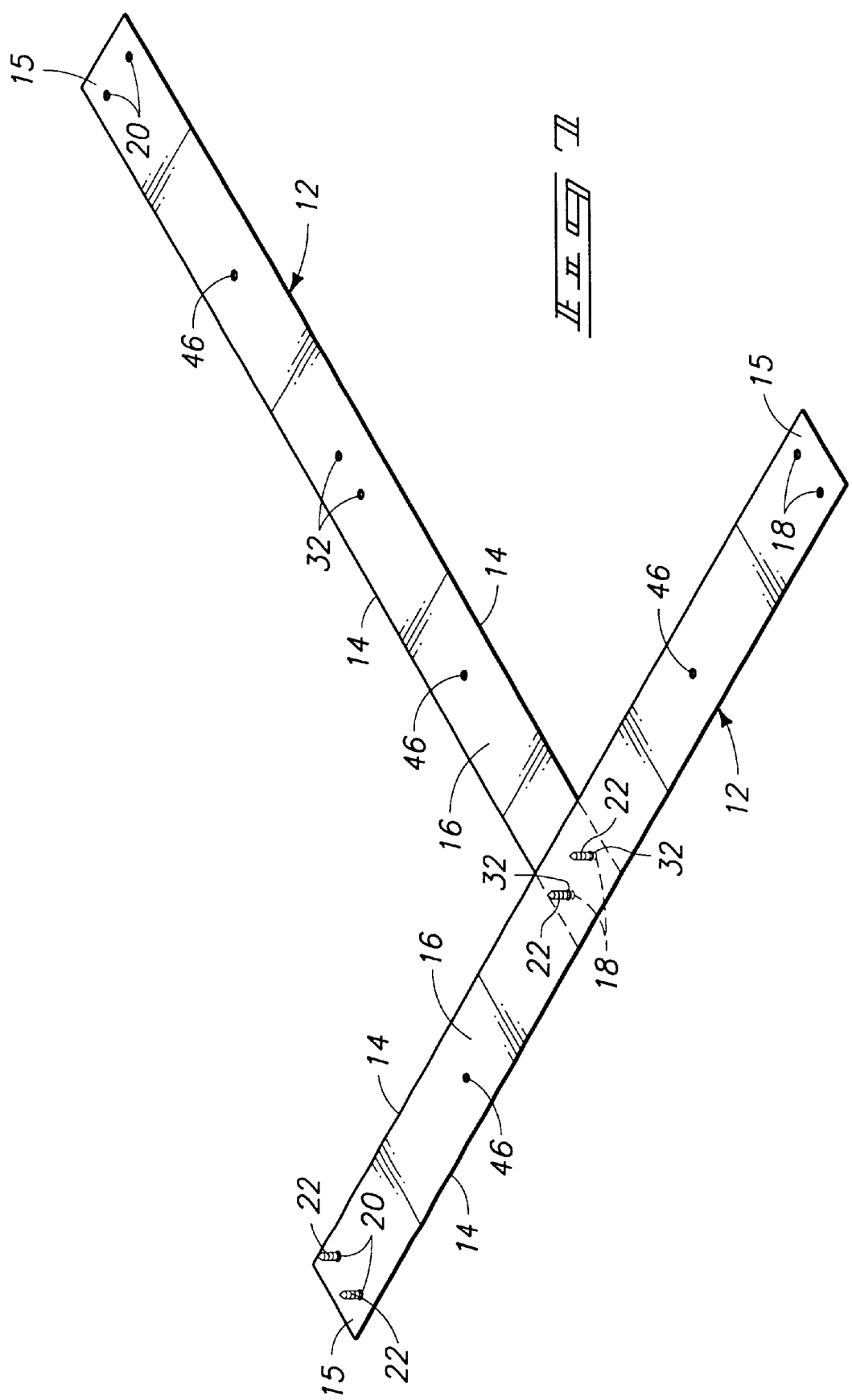
FIGS. 7–10 are a succession of views illustrating a process for forming a preferred baffle from first, second, and third strips of spring material.

Each baffle may be provided pre-assembled as illustrated in FIG. 1, or be provided as a kit, ready for assembly, as shown in FIG. 6. The baffles 10 may be assembled in dimensional cruciform "spheres". It is preferable that the present baffles 10 be used individually. However, if desired, the baffles may be connected together in a strand or in multiple strands.

For example a number of rows of the baffle components could be made into a flat rectangular matrix, or a series of rows and columns could be formed into a cubic configuration. The combination of configurations is almost without limit.

In a preferred form, the present baffle 10 includes substantially similar first and second loops, each being made up from at least one elongated strip 12, formed of a flexible spring material such as polyethylene plastic.

It has been found that polyethylene is a desirable material for the strips since the material is relatively impervious to most liquids. Further, polyethylene includes resilient or spring-like properties that are most desirable for the desired energy absorbing effect. Though polyethylene is preferred, polyvinyl chloride, nylon, stainless steel or other resilient sheet materials may also be used.

Each of the first and second strips 12 is preferably rectangular, including longitudinal side edges 14 joining opposed ends 15. The strip includes a preferred width dimension W extending transversely of the strip length between the sides 14. The width dimension may vary according to need, but will remain within an approximate relationship with the size of a loop formed by bending the strip until the ends 15 overlap. It is possible, if desired, that a baffle may be made with strips 12 of different width dimensions W. However, it is preferable that the widths be substantively similar.

The radius of the loop is indicated at R, and the thickness between inside and outside surfaces 16, 17 respectively is designated at T. Of course, the length dimension or circumference C (FIG. 6) of the strips 12 will vary depending upon the desired radius R of the loops to be formed, according to the formula $C=2\pi R$. Using the above dimensional indicia, the width W is preferred to be no greater than approximately 0.6 R, and the thickness T is preferably less than the width, advantageously approximately 0.0125 R.

Thus by way of example, a strip 12 formed into a loop having a radius R of 5 inches will preferably have a width dimension W of approximately 3 inches and a thickness dimension T of approximately 0.0625 inches. Likewise, a strip 12 formed into a loop having a radius of 36 inches will have a width W of up to 21.6 inches (though a smaller width dimension is preferred) and an approximate maximum thickness dimension T of 0.45 inches. This relationship is given for the preferred polyethylene strip material and has been found to be preferred for obtaining the maximum fluid energy absorption results known at the present time.

Each strip 12 includes at least one, and preferably a pair of end holes 18, 20 formed inwardly adjacent each end 15. Preferably, there are two pairs of such holes 18, 20 at either end of each strip. The holes are spaced apart across the strip at equal distances. The end holes 18, 20 are provided to receive barbed or other appropriate fastener members 22 which are used to secure the first and second strips together and lock the intersecting strips against rotation relative to one another.

In a preferred form, the fastener members 22 are one-way brads with a barbed external shank that may be pressed through the holes but that will not permit easy removal. Other forms of fasteners such as nut and bolt combinations may also be used.

Figure 2:
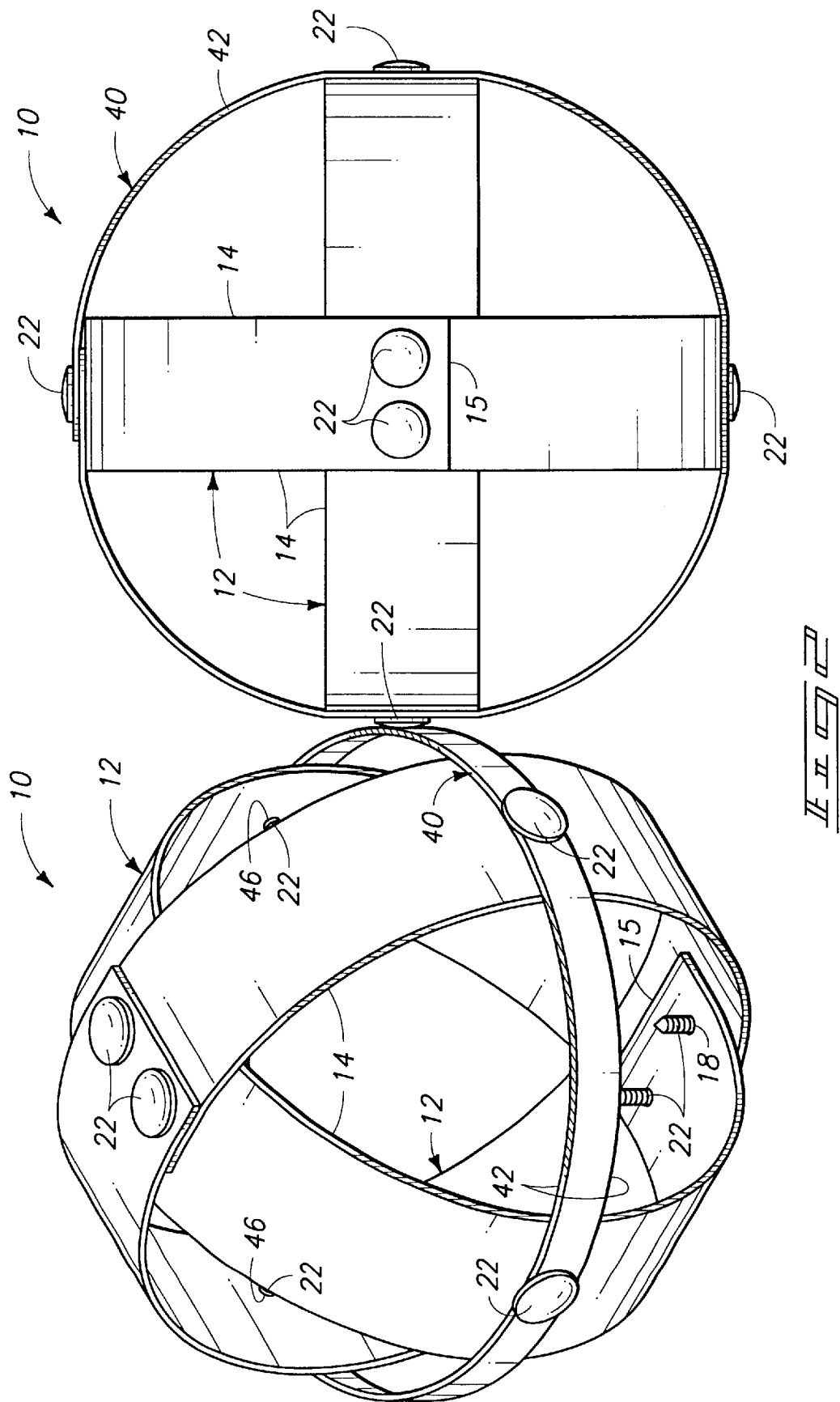
FIG. 2 is a side elevation view showing two baffle units engaging one another, with the present third ring preventing the baffle units from nesting together.

Each of the strips 12 are foldable into a loop configuration with the ends 15 overlapping and with the end holes 18, 20 aligned to receive at least one and more preferably two of the fastener members 22 (FIG. 2). The fastener members secure the strip materials in the loop configurations which, due to the inherent nature of the material, will deform upon application of force.

In a preferred embodiment a central hole, or more preferably a pair of holes 32 are provided, at the approximate longitudinal center of each strip on either side of a longitudinally centered hole 24. These holes 32 are longitudinally aligned and spaced apart the same distances as the spacing between the end holes 18 and 20 to permit two of the strips to be formed together with the loops intersecting and held in a cruciform configuration as shown in FIGS. 1 and 2.

As shown in FIG. 1, the loops intersect at two points along an axis X. The axis X passes through the intersecting points and is at least adjacent to the approximate centers of the loops. It is pointed out that the loops may be slightly out of round (not perfectly circular), and that the centers P may be slightly offset from one another. However such minor differences will not have significant effect so long as the loops are joined to one another and the centers are in proximity to the axis X.

The process for interconnecting two of the strips into this configuration is easily and quickly accomplished, as may be understood from the succession of illustrations in FIGS. 7–10. First, the two strips 12 may be arranged in a T-shaped orientation (FIG. 7) with the end holes 18 of one strip aligned with central holes 32 of the other strip. Barbed fastener members 22 may then be pushed through the aligned holes 18, 32 of the two overlapping strips. Additional fasteners 22 may also be pushed up through end holes 20 in one of the ends of the cross part of the T shape.

Next, the free end of the leg of the T configuration is bent over (FIG. 8) into a substantially circular form. The end holes 18 at the bent end of the strip may be secured to the projecting ends of the fastener members 22 that presently extend through the central holes 32 and end holes 18 at the juncture of the "T" shape. The first loop is now formed, along with the first intersection of the loops.

Next, a free end (without fasteners) of the remaining strip 12 may be bent over (FIG. 9) and be positioned with the end holes 20 aligned with the central holes 32 in the previously formed loop. This end is held in place while the remaining strip end is bent up and over until the fasteners can be inserted through the aligned central and end holes. The fasteners 22 may be pushed down through the aligned holes to complete formation of the second intersection and the second loop. A substantially circular cruciform configuration is thus formed.

The two loops now intersect at substantially right angles and points of intersection lie substantially along the axis X.

Figure 8:
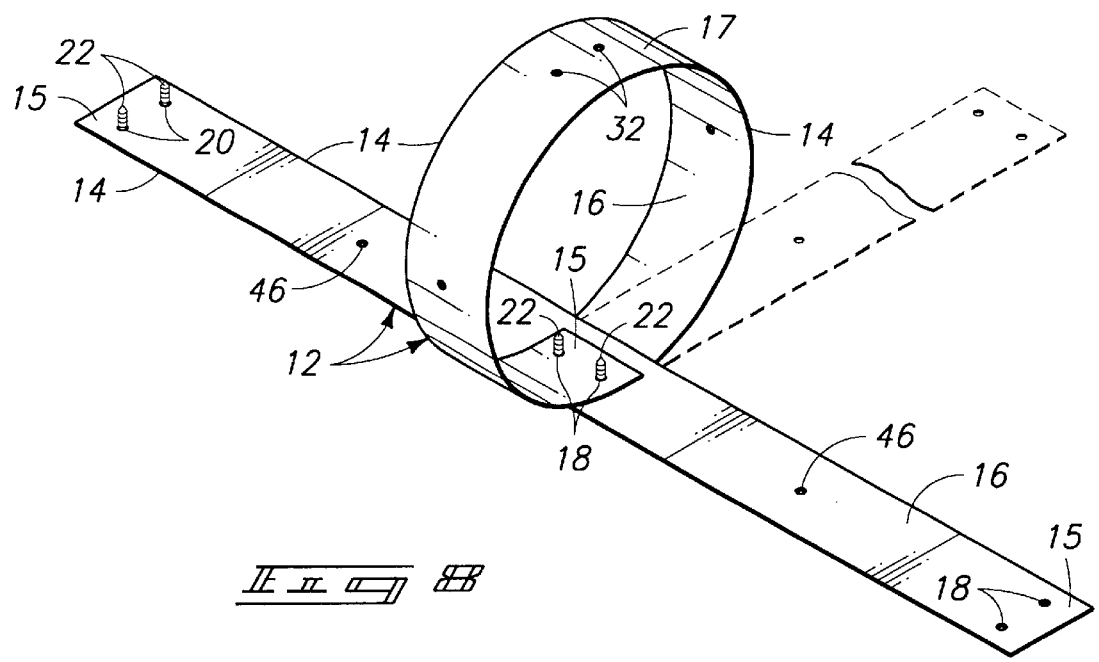
Figure 9:
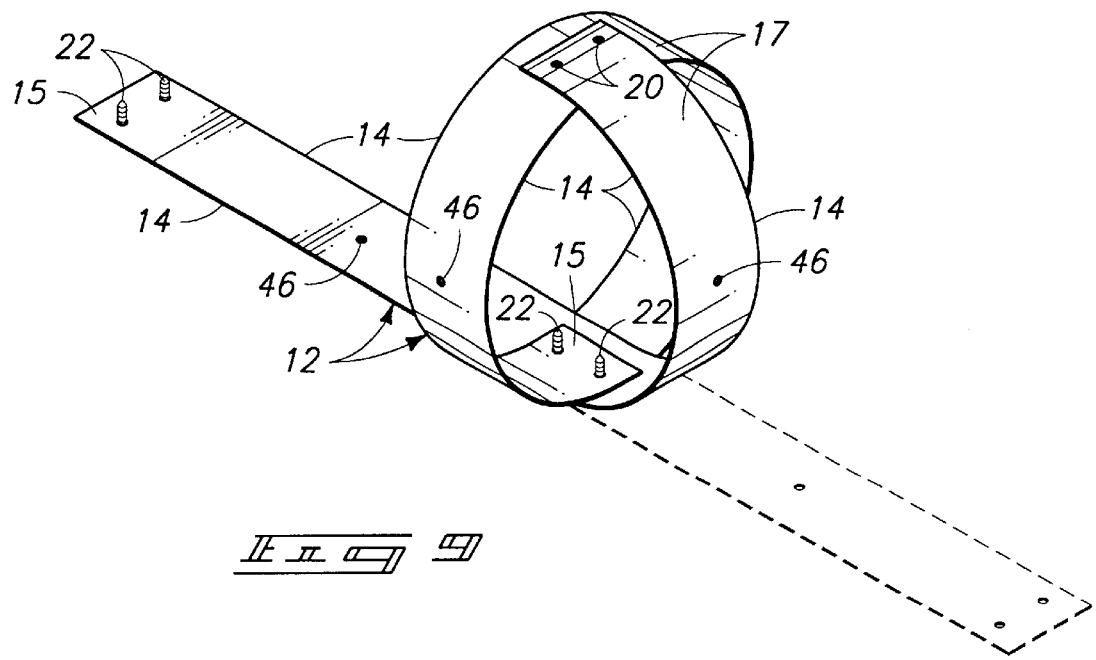

It is noted that the ends of the strips are preferably lapped over and under the first formed loop, and that the first formed loop ends are lapped over and under the second strip (see FIG. 8). The overlapping configuration allows for flush engagement of the strip ends with both inner and outward side surfaces at the center of the other strip, and results in a substantially circular loop configuration with the loops intersecting at approximate right angles that are locked against relative rotation about the axis X by the fasteners 22.

It is noted that there are gore shaped open spaces between the first and second loops. These spaces could allow nesting of adjacent baffles, especially in a confined space. To prevent this from happening, third loops are provided to span the open spaces.

FIG. 2 illustrates a third loop on one baffle functioning to keep the loops of an adjacent baffle from entering the adjacent open space. The third loop thus allows the baffles to function well even in confined spaces where the individual baffles are independent (not linked together).

A preferred third loop is formed of a flexible spring material strip 40 that is joined with the first and second loops at points along the axis between the intersection points of the first and second loops. Preferably, the third loop is mounted substantially midway along the axis X between the two intersecting points of the first and second loops. It is also preferable that the third loop be formed at substantially right angles to the first and second loops.

The third loop may be formed of the same spring-like materials as the first and second loops. It may be of the same thickness dimension, or have a different thickness depending upon the nature of intended use.

The preferred third loop will be formed of a strip 40 of a sufficient length to circumscribe both intersecting loops (see FIG. 2). It is preferred that the third loop extend about the outside surfaces of the first and second loops, so the engaged first and second loop surfaces will reinforce the third loop against radial inward collapse.

It may be noted that the illustrated strip 40 forming the third loop is narrower between longitudinal side edges 42 than the first and second loops. The width dimension may vary, however, up to the same approximate widths as the first and second loops. Also, as indicated above, the thickness dimension may vary according to need, but is preferably about the same thickness as the first and second strips 12.

Figure 3:
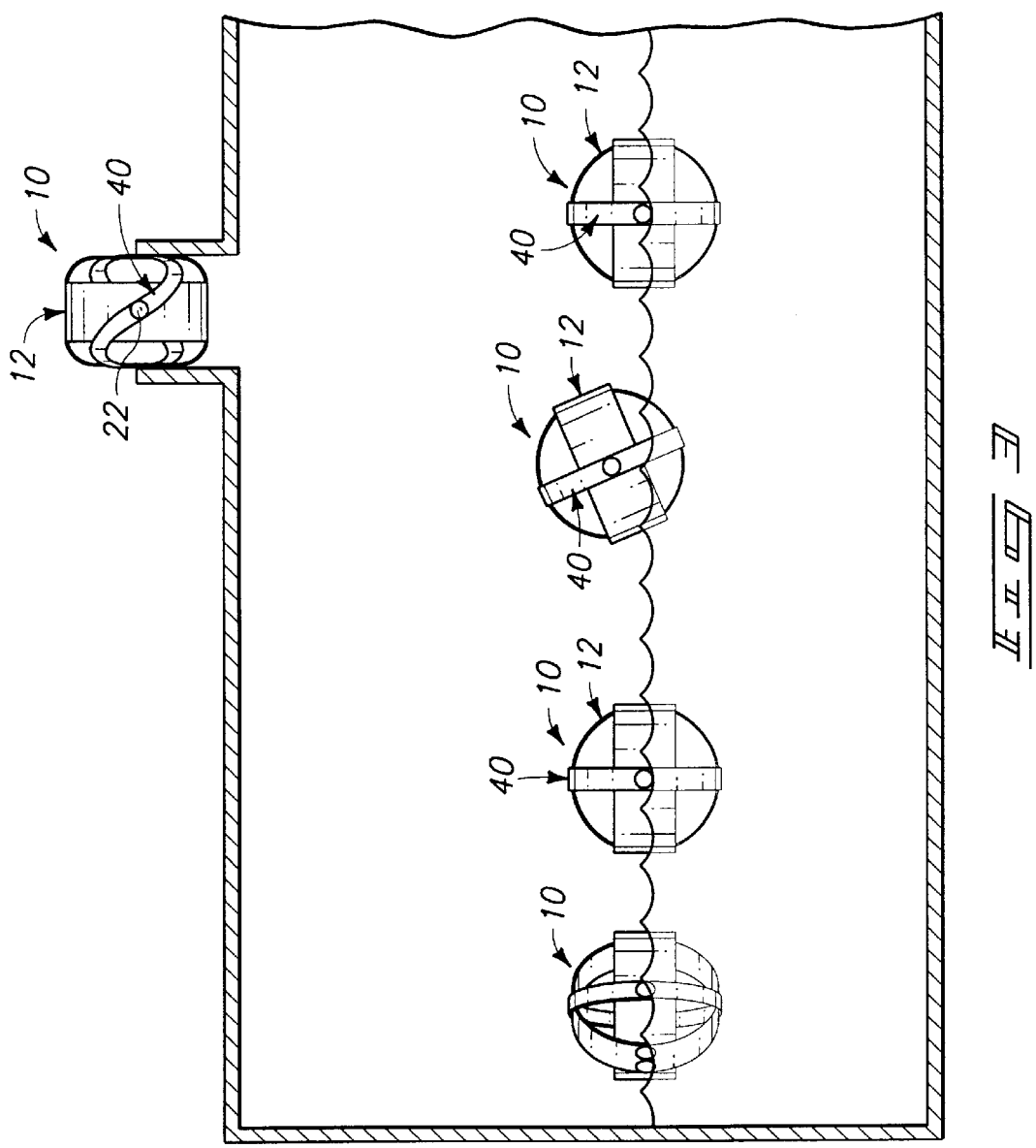
FIG. 3 is a diagrammatic operational view illustrating baffle units in a tank, with the first and second loops of a baffle being compressed and a third loop being twisted to fit through the tank opening.
Figure 4:
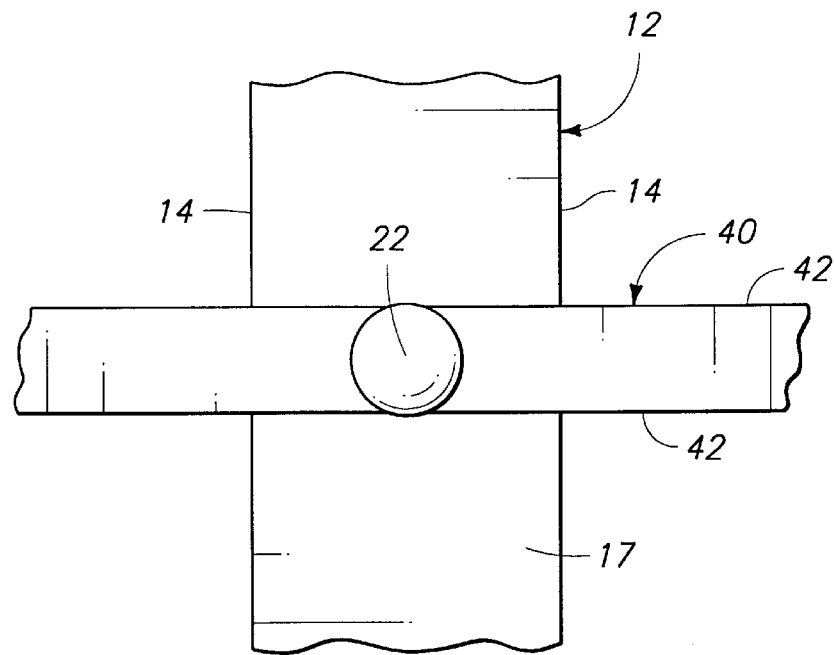
FIG. 4 is an enlarged fragmented view of the third ring in a normal orientation.

Narrow third loops may be preferred in instances where the baffles are to be inserted into tanks (FIG. 3) through narrow openings. The narrow strip 40 (being flexible and easier to bend than the first and second loops) may be easily twisted (compare FIGS. 4 and 5) to narrow the overall baffle diameter (FIG. 3). The illustration indicates several baffles 10 in a tank. However it may be desirable to loosely fill the tank with such baffles.

Figure 5:
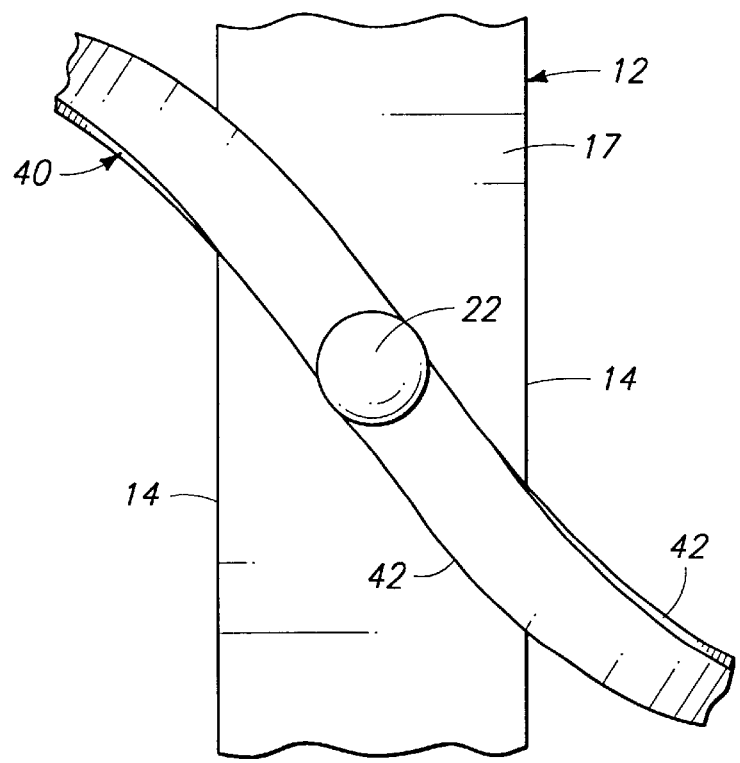
FIG. 5 is an enlarged fragmented view of the third loop in a twisted orientation.

The third loop is preferably pivotably joined to the first and second loops. Most preferably, pivot points are provided at all four points where the third loop intersects the first and second loops. The pivots may be formed by more of the same fastener members 22, pressed through holes 44, formed through and substantially equally spaced along the third strip 40. Holes 46 are provided in the strips 12 and are centered between the end holes 18, 20 and center holes 32, for alignment with the third loop holes 44. Single fasteners 22 are fitted through aligned holes 44, 46, preferably at each of the four intersections, to allow the third loop to pivot when compressed and twisted as shown in FIGS. 3 and 5.

Figure 10:
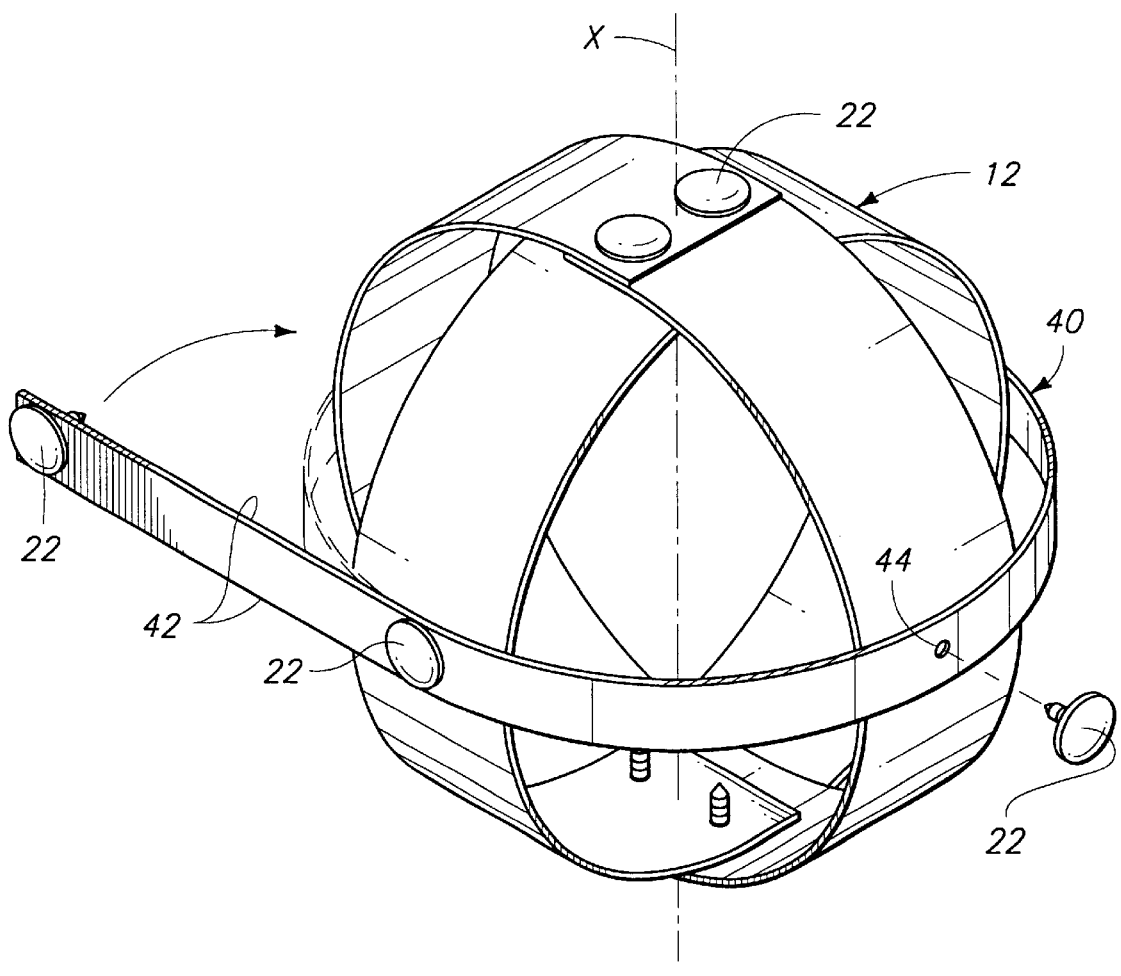

FIG. 10 shows connection of the third strip 40 to the previously formed first and second loops. One end of the third strip is positioned with an end hole 44 aligned with one of the holes 46 formed in one of the first or second strips. The strip end is held in place as the remainder is bent around the first and second loops so the remaining holes 44 move into alignment with the successive holes 46. Fastener members 22 may then be inserted through the aligned holes. The free end of the strip is bent so the end holes 44 align with the adjacent remaining hole 46 in the first or second loops. The ends will overlap as shown in FIG. 2, and a fastener member 22 may be inserted through the aligned holes to complete the baffle.

A baffle 10 formed in the above manner has certain advantages in use especially in tanks as shown in FIG. 3. A number of the baffles may be formed as described above and then be pressed through an opening in a tank and into the tank interior.

FIG. 3 shows several baffles 10 in the illustrated tank. However, it may be preferable that the tank be filled with baffles, with successive baffles engaging and slightly compressing one another. Wave or sloshing action of the liquid against the baffle elements will cause the elements to resiliently compress or deflect. The baffles may thus absorb the force of the shifting liquid and effectively baffle or dampen such motion.

The third loops function during this time to prevent the baffles from nesting together, even if compressed. Thus the resiliency of the various loops within the individual baffles is maintained to react against and stabilize the liquid.

A strand of the baffles may joined by a cord, cable, or rod for use outside tanks, as wave breaks or as buffers against a seawall or earthen embankment to ameliorate erosion caused by current and wave action. Thus, the baffles may be configured in strands or matrix configurations suited for placement along beaches, stream embankments, seawalls, piers, dams, or other selected surface with the longitudinal side edges 14 of the loops placed substantially parallel to the water surface. The loops will flex almost indefinitely without observable wear, between the engaged surface and the wave or current forces, while protecting the adjacent surface against erosion.

An interlinked strand of the baffles may also be used as a wave break in open water, to calm an enclosed water surface within a swimming, boat docking or other area where calm water is desired. The strand is placed along a desired line or lines about the perimeter of the area. One of the loops in each cruciform shape will always be at least nearly horizontal (parallel to the water surface as shown in FIG. 11) and the remaining strip (of the cruciform shape) may be used to resiliently bolster the horizontal baffle against deformation due to wave action.

In all the situations exemplified above, the third loops will function to prevent the baffles from nesting together. Further, the third loops add resiliency or yieldable resistance to deformation according to the thickness and construction material of the third loop.

It is pointed out that the present baffles may be provided in a kit form (see FIG. 5). With this arrangement, the a large number of baffles may be easily transported and stored prior to use. The kit may be easily transported in extremely compact condition and stored in confined areas until such time that assembly and use is desired. The kit form is especially beneficial for areas needing a form of emergency readiness, for example against potential embankment erosion damage due to periodic flash flooding.

Thus, for example, a farmer using the baffles in a chemical spray tank may obtain a sufficient number of the strips to effectively baffle the tank by assembling and then pressing one baffle after another (either individually as shown in FIG. 3, or a number of the baffles may be threaded along a common link) into the tank until desired baffling is obtained. Similarly, a resort operator could assemble one or more strands of linked baffles into a strand to cordon off a desired swimming or docking area, simply by adding successive baffles along one or more links until a desired strand length is obtained.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A liquid stabilizing baffle, comprising:
   first and second loops each being formed by a strip of flexible spring material;
   wherein the first and second loops intersect one another at two intersection points along an axis; and
   a third loop formed of a flexible spring material strip, joined with the first and second loops at points between the intersection points of the first and second loops.

2. The liquid stabilizing baffle of claim 1, wherein the first and second loops are locked against rotation about the axis.

3. The liquid stabilizing baffle of claim 1, wherein the first and second loops are locked against rotation about the axis; and wherein the third loop is pivotably connected to the first and second loops.

4. The liquid stabilizing baffle of claim 1, wherein the first, second, and third loops are formed of polyethylene plastic material.

5. The liquid stabilizing baffle of claim 1, wherein the third loop circumscribes the first and second loops.

6. The liquid stabilizing baffle of claim 1, wherein the third loop circumscribes and is pivotably joined with the first and second loops.

7. The liquid stabilizing baffle of claim 1, wherein the third loop is formed on a radius from the axis and circumscribes the first and second loops.

8. The liquid stabilizing baffle of claim 1, wherein the first, second and third loops intersect at substantially right angles and are formed about an approximate common point.

9. The liquid stabilizing baffle of claim 1, wherein:
   each loop is formed of polyethylene plastic material;
   the first, second and third loops are formed substantially about a common center point, with each at an approximate radius from the center point; and
   each of the loops includes longitudinal side edges that are separated by a width dimension less than the radius.

10. The liquid stabilizing baffle of claim 1, wherein:
    the first, second and third loops are formed about a substantially common center point with each at an approximate radius from the center point; and
    wherein each of the loops includes longitudinal side edges that are separated by a width dimension less than the radius.

11. A liquid stabilizing baffle, comprising:
    first and second substantially circular loops formed about an approximate center point and joined to one another at intersection points along an axis;

each of the first and second loops being formed of flexible spring-like strips at a radius from the approximate center point;

the first and second loops each including substantially annular side edges spaced apart by a width dimension;

the first and second loops each further including substantially concentric annular outer and inner surfaces joining the substantially annular side edges and spanning the width dimension;

wherein the inner and outer surfaces of each first and second loop are spaced apart radially with respect to the approximate center point by a thickness dimension;

wherein the thickness dimension is less than the width dimension and the width dimension is less than the radius; and a third loop formed about the axis and joined with the first and second loops.

12. The liquid stabilizing baffle of claim 11, wherein the first and second loops are formed of polyethylene plastic.

13. The liquid stabilizing baffle of claim 11, wherein the third loop is joined to the first and second loops at pivot points.

14. The liquid stabilizing baffle of claim 11, wherein the width dimension of the first and second loops is no greater than approximately 0.6 times the radius.

15. The liquid stabilizing baffle of claim 11, wherein the third loop includes a width dimension between annular side edges that is less than the width dimensions of the first and second loops.

16. The liquid stabilizing baffle of claim 11, wherein the third loop circumscribes the first and second loops.

17. The liquid stabilizing baffle of claim 11, wherein the third loop circumscribes the first and second loops and is connected to the first and second loops at pivot points.

18. A liquid stabilizing baffle, comprising:

substantially circular first and second loops formed of flexible spring-like plastic strips on substantially equal radii from a central point, the loops intersecting one another at angles to form a substantially three dimensional circular cruciform configuration;

the first and second loops each including substantially annular side edges spaced apart axially by a width dimension;

the first and second loops each further including substantially concentric annular outer and inner surfaces joining the side edges and spanning the width dimension;

wherein the inner and outer surfaces are spaced apart radially by a thickness dimension;

wherein the thickness dimension of each loop is less than the width dimension thereof and the width dimension is less than the radius thereof; and a third loop formed of spring material joined to and oriented at substantially right angles to the first and second loops.

19. The liquid stabilizing baffle of claim 18 wherein the third loop substantially circumscribes the first and second loops.

20. The liquid stabilizing baffle of claim 18 wherein the third loop is pivotably connected to the first and second loops.

* * * * *